(12) United States Patent
Fukui

(10) Patent No.: US 7,566,065 B2
(45) Date of Patent: Jul. 28, 2009

(54) BICYCLE CABLE INSTALLATION AIDING DEVICE

(75) Inventor: Seiji Fukui, Sakai (JP)

(73) Assignee: Shimano Inc., Osaka (JP)

( * ) Notice: Subject to any disclaimer, the term of this patent is extended or adjusted under 35 U.S.C. 154(b) by 442 days.

(21) Appl. No.: 11/485,411

(22) Filed: Jul. 13, 2006

(65) Prior Publication Data
US 2007/0108723 A1    May 17, 2007

(30) Foreign Application Priority Data

Nov. 16, 2005    (JP)    ............................. 2005-331630

(51) Int. Cl.
*B62K 3/02*    (2006.01)
(52) U.S. Cl. ..................... 280/281.1; 280/279; 280/280
(58) Field of Classification Search .............. 280/281.1, 280/279, 280
See application file for complete search history.

(56) References Cited

U.S. PATENT DOCUMENTS

| | | | |
|---|---|---|---|
| 4,102,219 A | | 7/1978 | Plamper |
| 4,768,798 A | * | 9/1988 | Reed et al. ................ 280/281.1 |
| 6,220,398 B1 | * | 4/2001 | Wu ........................... 188/24.11 |
| 6,983,949 B2 | * | 1/2006 | Ueno et al. .................. 280/279 |
| 7,396,032 B2 | * | 7/2008 | Horiuchi ...................... 280/279 |
| 2006/0145446 A1 | * | 7/2006 | Schmider ................. 280/281.1 |

FOREIGN PATENT DOCUMENTS

| | | |
|---|---|---|
| EP | 1598263 A2 | 11/2005 |
| JP | 2005-053363 A | 3/2005 |
| NL | 63610 C | 7/1949 |

* cited by examiner

*Primary Examiner*—Lesley D Morris
*Assistant Examiner*—Michael R Stabley
(74) *Attorney, Agent, or Firm*—Global IP Counselors, LLP

(57) ABSTRACT

A cable installation aiding device is used to aid in the installation of cable members (e.g., brake cables or the like) in a steerer tube of a bicycle. The cable installation aiding device has an attachment part and a first cable guide part. The attachment part is preferably attached to the inner circumferential surface of the steerer tube. The first cable guide part is configured and dimensioned to guide cable members passing through the steerer tube between a first axial end of the steerer tube and an outer circumferential side opening of the steerer tube that is spaced from a second axial end of the steerer tube.

10 Claims, 7 Drawing Sheets

BICYCLE CABLE INSTALLATION AIDING DEVICE

CROSS-REFERENCE TO RELATED APPLICATIONS

This application claims priority under 35 U.S.C. § 119 to Japanese Patent Application No. 2005-331630. The entire disclosure of Japanese Patent Application No. 2005-331630 is hereby incorporated herein by reference.

BACKGROUND OF THE INVENTION

1. Field of the Invention

This invention generally relates to a cable installation aiding device. More specifically, the present invention relates to a bicycle cable installation aiding device which is used to install cable members such as wiring cords, brake cables, gearshift cables, hydraulic tubes and the like in the steerer tube of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Typically, bicycles include many cable operated components. Thus, various cables are installed along the frame. For example, cable members such as brake cables, gearshift cables, hydraulic tubes used for the brakes, and the like are installed along the frame, including the steerer tube and frame body. Recently, electrically controlled bicycles have also been developed in which an electrically operated gearshift and electromotive assist are performed. In such bicycles, electrical cords are also installed along the frame as cable members. When such numerous cable members are installed along the frame of the bicycle, many cable members are exposed to the outside of the bicycle, so that there is a danger of deterioration in the external appearance of the bicycle. Furthermore, there is a danger that these exposed cable members will contact external objects, thus resulting in damage or wire breakage. Accordingly, a technique is known in which cable members that connect the handlebars with the brakes or gearshift device are threaded through the steerer tube of the front fork from the handlebars, so that the exposure of the cable members can be reduced (e.g., see Japanese Patent Application Laid-Open No. 2005-53363).

In the abovementioned prior art, a cable member such as a hydraulic tube used for the front and rear brakes, a wiring cord, or the like is inserted into an interior part partitioned by a partition wall part disposed in the handlebars. This cable member is then threaded through the steerer tube via the handlebar stem, and is led out to the outside from the lower end of the steerer tube. This cable member is then introduced into the interior of the frame body via a through-hole formed in the frame body. Furthermore, a cable member (hydraulic tube) used for the front brake device is extended toward the front brake device from the lower end of the steerer tube.

In the abovementioned prior art, a cable member is led out from the lower end of the steerer tube and is then introduced into the interior of the frame body during installation of cable members running from the steerer tube toward the frame body and other parts on the outer circumferential side of the steerer tube. Accordingly, the exposed portions are reduced. However, the cable member is exposed between the lower end of the steerer tube and the frame body.

In view of the above, it will be apparent to those skilled in the art from this disclosure that there exists a need for an improved cable installation aiding device. This invention addresses this need in the art as well as other needs, which will become apparent to those skilled in the art from this disclosure.

SUMMARY OF THE INVENTION

One object of the present invention is to provide a bicycle cable installation aiding device that reduces the exposure of a cable member as far as possible in the installation of the cable member from the steerer tube to the outer circumferential side.

The foregoing object and other can basically be attained by providing a bicycle cable installation aiding device that basically comprises an attachment part and a first cable guide part. The attachment part is configured to be attached to an inner circumferential surface of a steerer tube of a bicycle. The first cable guide part is coupled to the attachment part. The first cable guide part is configured and dimensioned to guide at least one first cable member passing through the steerer tube between a first axial end of the steerer tube and an outer circumferential side opening of the steerer tube that is spaced from a second axial end of the steerer tube.

In this cable installation aiding device, the attachment part of the installation device is first attached to the inner circumferential surface of the steerer tube. When wiring is inserted into the interior from one end of the steerer tube in this state, the direction is changed by the first cable guide part so that the cable member is guided to the outer circumferential side of the steerer tube. A through-hole is formed in the steerer tube and the head tube for supporting this steerer tube in the direction that has been changed to the outer circumferential side. As a result, the cable member can easily be guided to the outer circumferential side of the steerer tube, such as the interior of the frame body or the like. The system is devised so that the attachment part can be attached to the inner circumferential surface of the steerer tube, and that the direction of the cable member can be changed to the outer circumferential side of the steerer tube by the first cable guide part. The cable member can therefore be simply guided to the outer circumferential side or one end of the steerer tube, such as to the frame body or the like, merely by machining a hole that communicates with the steerer tube or head tube so that the cable member is inserted from one end or the outer circumferential side of the steerer tube. Accordingly, the exposure of a cable member can be minimized in the installation of a cable member from the steerer tube to the outer circumferential side.

A bicycle cable installation aiding device of a second aspect of the present invention is a bicycle cable installation aiding device according to the first aspect of the present invention, wherein a second cable guide part coupled to the attachment part, the second cable guide part being configured and dimensioned to guide at least one second cable member passing through the steerer tube between a second axial end of the steerer tube and the outer circumferential side opening of the steerer tube. In this case, a separate cable member that connects the outer circumferential side of the steerer tube and the other end of the steerer tube, e.g., an electrical cord that connects the generating hub and an electrical part such as a control unit or the like, can be guided to the other end from the outer circumferential side of the steerer tube by the second cable guide part, and exposure of the cable members can be further reduced.

A bicycle cable installation aiding device of a third aspect of the present invention is a bicycle cable installation aiding device according to the first or second aspect of the present invention, wherein the attachment part and the first cable guide part are integrally formed as a one-piece, unitary member. In this case, the attachment part and first cable guide part are integrally formed, and the attachment of the installation device to the inner circumferential surface of the steerer tube can therefore be facilitated.

A bicycle cable installation aiding device of a fourth aspect of the present invention is a bicycle cable installation aiding device according to any one the first to third aspects of the present invention, wherein the attachment part and the first cable guide part are configured to form a gap for receiving at least one third cable member pass between the attachment part and an inner circumferential surface of the steerer tube when the attachment part is attached to the steerer tube. In this case, cable members can pass not only through the guide part, but also through the area around the attachment part. Accordingly, the system is devised so that cable members such as electrical wiring cords that connect electrical devices installed on the handlebars with the generating hub, flexible cables that connect front brake levers with the front brake device, and the like can be threaded through the interior of the steerer tube.

A bicycle cable installation aiding device of a fifth aspect of the present invention is a bicycle cable installation aiding device according to any one the first to fourth aspects of the present invention, wherein the first cable guide part includes a curved guiding surface that bends so that first axial end of the steerer tube and the outer circumferential side opening are connected when the attachment part is attached to the steerer tube. In this case, the cable member can be smoothly guided to the outer circumferential surface of the steerer tube by the bent guiding surface.

A bicycle cable installation aiding device of a sixth aspect of the present invention is a bicycle cable installation aiding device according to any one the first to fifth aspects of the present invention, further comprising a fork rotation limiter arrangement configured and dimensioned to be attached to an outer circumferential surface of the steerer tube and an inner circumferential surface of a head tube to limits rotation of the steerer tube to a specified range. In this case, since the relative movement of the head tube and steerer tube is limited by the fork rotation limiter, there is no problem of damage to the cable members.

A bicycle cable installation aiding device of a seventh aspect of the present invention is a bicycle cable installation aiding device according to the sixth aspect of the present invention, wherein the fork rotation limiter comprises a limiting member and a limiting projection. The limiting member is configured and dimensioned to be attached to the outer circumferential surface of the steerer tube together with the attachment part. The limiting member includes first and second limiters that are disposed at a specified interval in a circumferential direction. The limiting projection is configured and dimensioned to be fastened to the head tube, with a distal end of the limiting projection disposed between the two limiters when the fork rotation limiter is couple between the steerer tube and the head tube. In this case, the fork rotation limiter can be attached to the outer circumferential surface of the steerer tube together with the attachment part attached to the inner circumferential surface of the steerer tube, and attachment of the fork rotation limiter can therefore be facilitated. Furthermore, the steerer tube and head tube undergoes relative rotation so that the limiting projection comes into contact with the first or second limiter, and thus limits the range of rotation. As a result, the range of rotation can be securely limited.

A bicycle cable installation aiding device of an eighth aspect of the present invention is a bicycle cable installation aiding device according to any one the first to seventh aspects of the present invention, wherein the first cable guide part guides a Bowden brake cable or gearshift cable as the abovementioned cable member. In this case, the exposure of a flexible brake cable or gearshift cable can be minimized.

A bicycle cable installation aiding device of a ninth aspect of the present invention is a bicycle cable installation aiding device according to any one the first to seventh aspects of the present invention, wherein the first cable guide part guides a hydraulic tube as the abovementioned cable member. In this case, the exposure of the hydraulic tube can be minimized.

A bicycle cable installation aiding device of a tenth aspect of the present invention is a bicycle cable installation aiding device according to any one the first to seventh aspects of the present invention, wherein at least one part selected from the first cable guide part and second cable guide part guides a wiring cord used as the abovementioned cable member to connect electrical devices. In this case, the exposure of the wiring cord can be minimized.

In the present invention, the system is devised so that an attachment part can be attached to the inner circumferential surface of the steerer tube and that the direction of the cable member can be changed to the outer circumferential side of the steerer tube by means of a first cable guide part. Accordingly, by machining a through-hole that communicates with the steerer tube or head tube, the cable member can be guided in a simple manner to the outer circumferential side of the steerer tube, such as to the frame body or the like, merely by inserting the cable member from one end. Accordingly, the exposure of such cable members can be minimized in running cable members to the outer circumferential side from the steerer tube.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
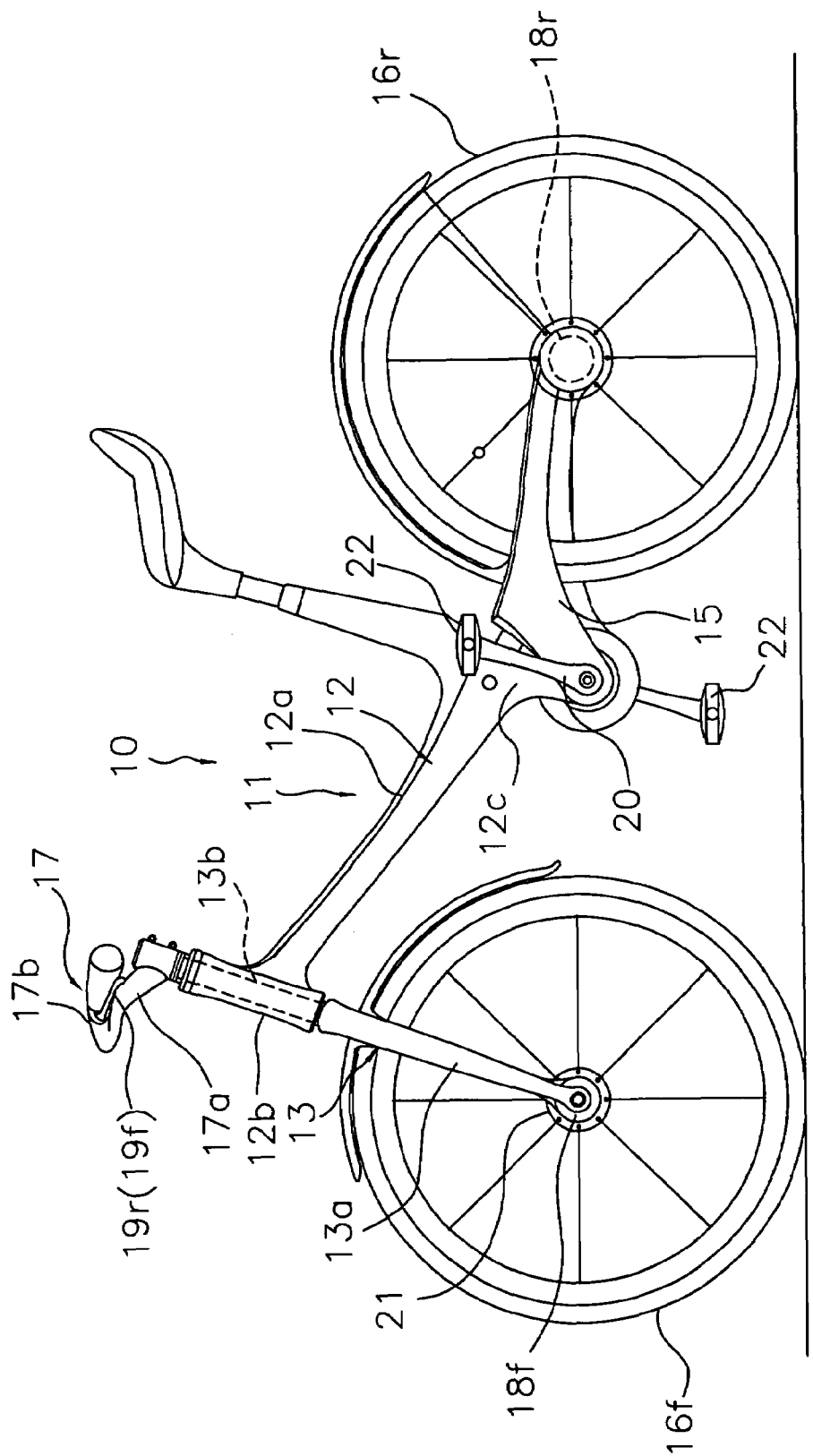
FIG. 1 is a side elevational view of a bicycle equipped with one embodiment of the present invention.

Referring initially to FIG. 1, a bicycle 10 is illustrated that includes one preferred embodiment of the present invention. In FIG. 1, the bicycle 10 basically includes a frame body 12 which is bent into a V shape, and a front fork 13. Furthermore, the bicycle 10 has a driving unit 15 swingably mounted on the lower part of the frame body 12, a front wheel 16f which is mounted on the lower end of the front fork 13, a rear wheel 16r which is mounted on the rear end of the driving unit 15, and a handlebar part 17 which is connected to the upper part of the front fork 13.

Figure 2:
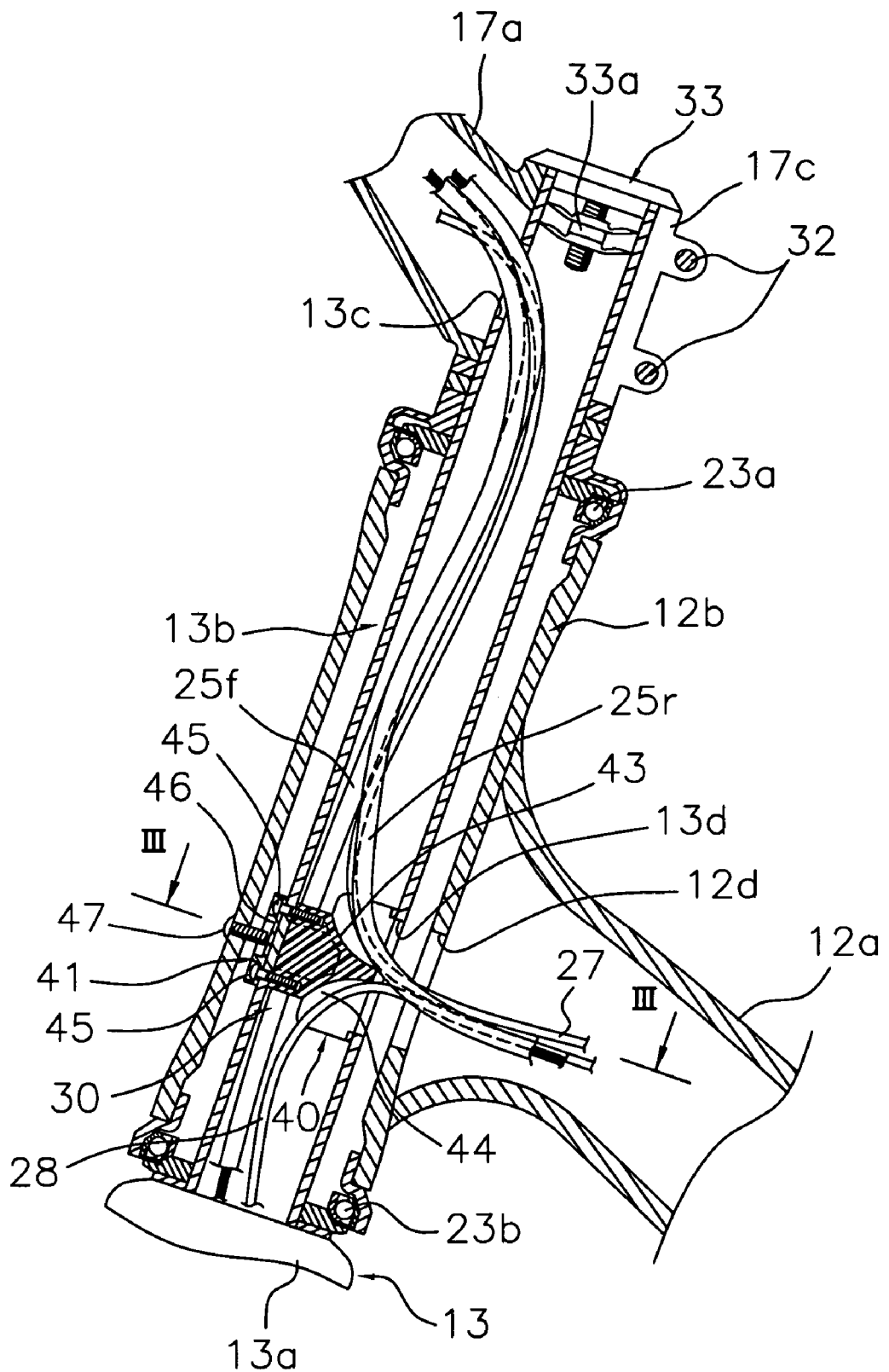
FIG. 2 is a partial cross sectional view of the area around the head tube of the bicycle illustrated in FIG. 1.

The frame body 12 has a hollow frame main body 12a, a head tube 12b and a hanger part 12c. The hollow frame main body 12a is bent into a V shape. The head tube 12b is disposed on the front part of the frame main body 12a and supports the front fork 13 so that the front fork 13 is free to rotate about an inclined vertical axis. The hanger part 12c is formed so that this hanger part 12c extends downward from the bent part of the of the frame main body 12a. The hanger part 12c supports the driving unit 15 so that the driving unit is free to swing about the horizontal axis. As is shown in FIG. 2, for example, a slot-shaped first through-hole 12d is formed in the rear surface of the head tube 12b. The hole communicates with the frame main body 12a and is extended in the circumferential direction so that no problems are created in the cable member even if the steerer tube 13b is rotated approximately 160 degrees. Furthermore, two bearings 23a and 23b are used to rotatably support the steerer tube 13b. The bearings 23a and 23b are mounted on the upper and lower ends of the head tube 12b.

The front fork 13 has a fork part 13a with a front wheel 16f mounted on the lower end thereof, and a steerer tube 13b installed with an upright orientation on the upper end of the fork part 13a. This steerer tube 13b is rotatably mounted in the head tube 12b. A second through-hole 13c which communicates with the below-described handlebar stem 17a is formed in the front surface at the upper end of the steerer tube 13b, and a third through-hole 13d which can communicate with the first through-hole 12d is formed in the rear surface at the lower end. The third through-hole 13d is a circular shape or rectangular shape opening so as to allow communication with the first through-hole 12d. Thus, the third through-hole 13d is an outer circumferential side opening of the steerer tube 13b. The front fork 13 is rotatably mounted in the head tube 12b in a state in which the ball race of the bearings 23a and 23b is adjusted by means of a conventionally configured mounting member 33 which is mounted on the upper part of the handlebar stem 17a, and in which a nut part 33a is engaged with the interior of the steerer tube 13b.

As is shown in FIG. 1, a crank unit 20 in which a pedal 22 is attached to the distal end thereof is mounted on the front end part of the driving unit 15. An internal gearshift hub and an electrically driven gearshift unit which drives the internal gearshift hub (not shown in the figures) are disposed inside the driving unit 15. Furthermore, for example, a power generating hub 21 into which a brake device 18f having a roller brake configuration is incorporated is mounted on the front wheel 16f, and, for example, a brake device 18f having a roller brake configuration is mounted on the rear wheel 16r.

The handlebar part 17 has a handlebar stem 17a which is fastened to the upper end part of the steerer tube 13b of the front fork 13, and a handlebar 17b whose central part is fastened to the handlebar stem 17a. The brake levers 19f and 19r are mounted on both ends of the handlebar 17b for operating the front and rear brake devices 18f and 18r, respectively. Furthermore, a gearshift switch (not shown in the figures) used for the gearshift operation of the electrically driven gearshift unit is disposed on one end of the handlebar 17b. The electrically driven gearshift unit is driven by power from the power generating hub. The handlebar stem 17a has a slit 17c and is fastened to the upper part of the steerer tube 13b by narrowing this slit 17c with the aid of two tightening bolts 32. Furthermore, the front fork 13 is rotatably mounted in the head tube 12b in a state in which the ball race of the bearings 23a and 23b is adjusted by means of a mounting member mounted on the upper part of the conventionally configured handlebar stem 17a in which a nut part 33a is engaged with the interior of the steerer tube 13b.

Figure 3:
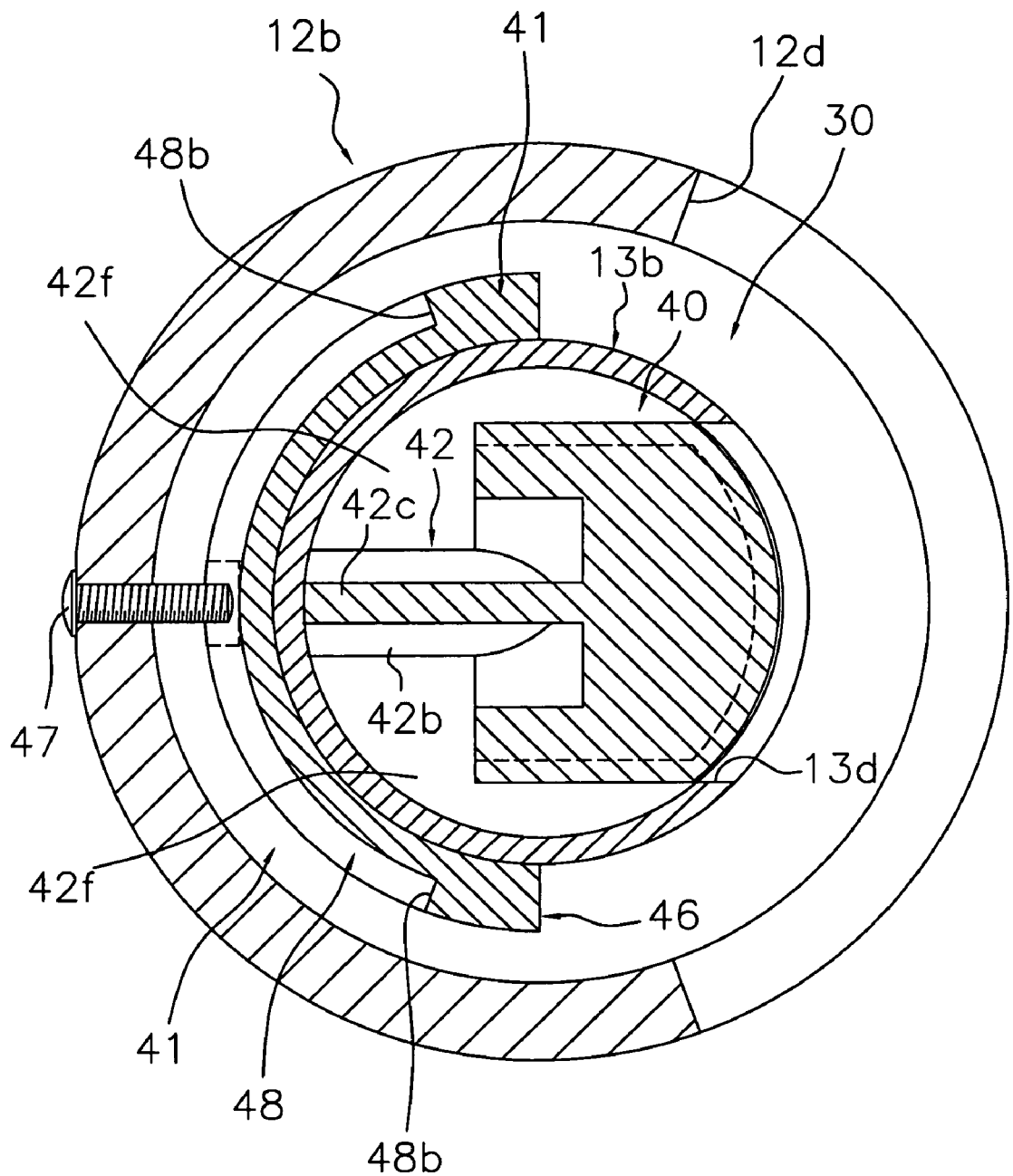
FIG. 3 is a cross sectional view of the steering arrangement as seen along section line III-III in FIG. 2.
Figure 4:
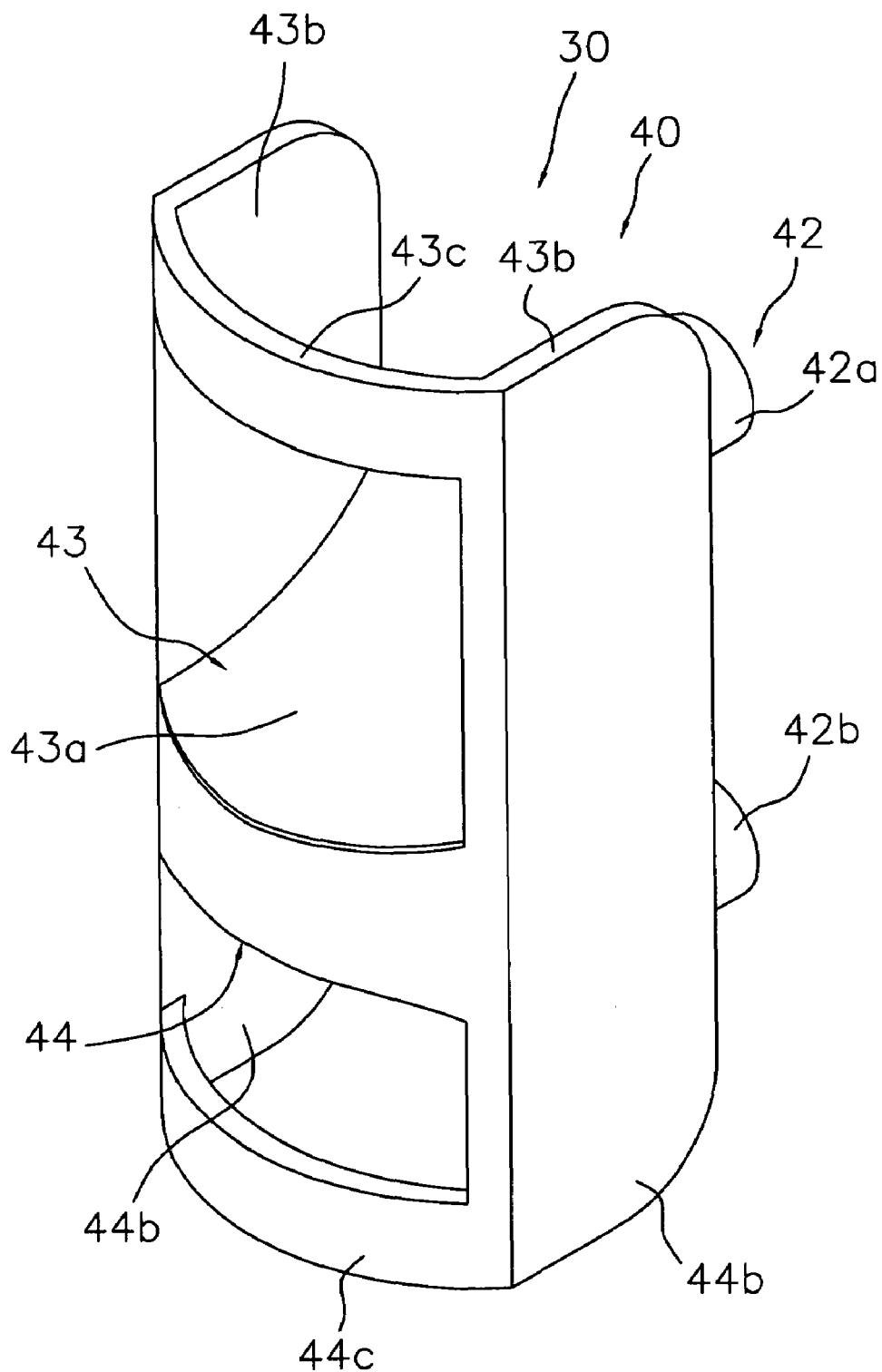
FIG. 4 is a front perspective view of the guide member in accordance with the present invention.
Figure 5:
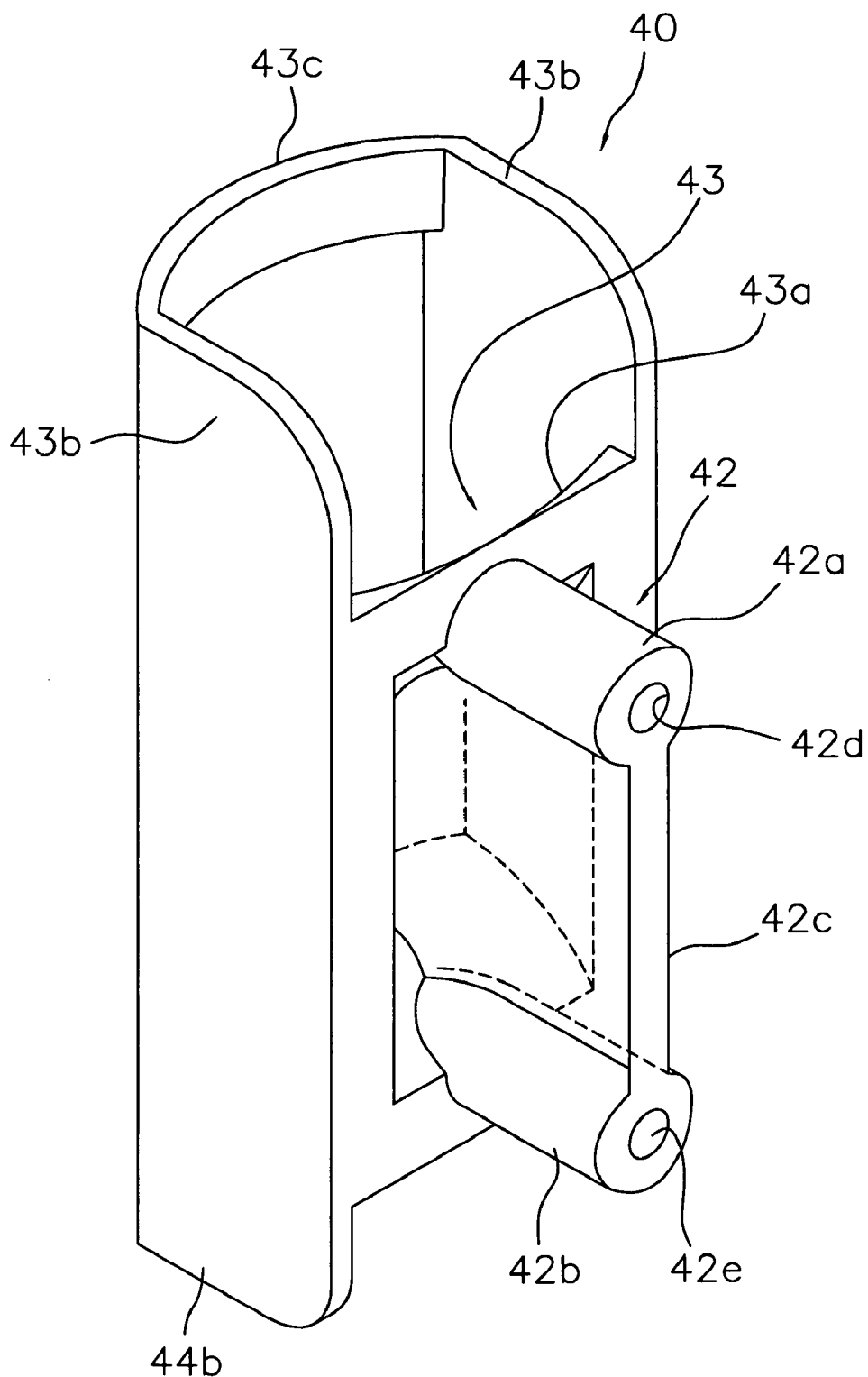
FIG. 5 is a back perspective view of the guide member in accordance with the present invention.
Figure 6:
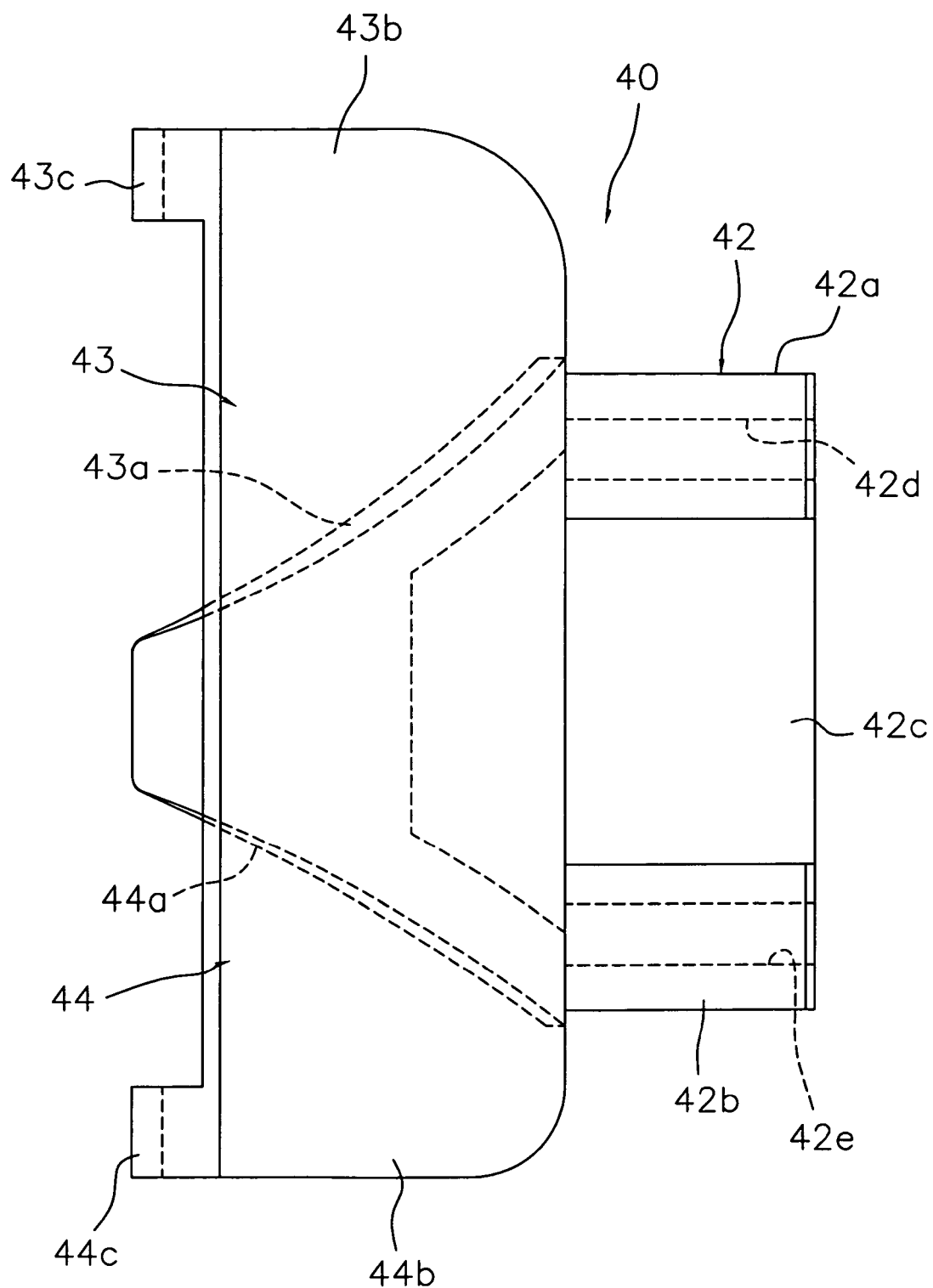
FIG. 6 is a side elevational view of the guide member in accordance with the present invention.

Inside the steerer tube 13b, Bowden type front and rear brake cables 25f and 25r are threaded through as cable members that connect the front and rear brake devices 18f and 18r and the front and rear brake levers 19f and 19r, as is shown in FIGS. 2 and 3. Furthermore, a first electrical wiring cord 27 is threaded through as a cable member that electrically connects the gearshift switch and the electrically operated gearshift unit, and a second electrical wiring cord 28 is threaded through as a cable member that connects the power generating hub 21 and the electrically operated gearshift unit. Furthermore, a cable installation aiding device 30 that is used to install and guide the rear cable member 25r and first and second wiring cords 27 and 28 (among the cable members that are threaded through) to the steerer tube 13b is attached inside the steerer tube 13b. Alternatively, the brake cables 25f and 25r are hydraulic tubes and the front and rear brake devices 18f and 18r are hydraulic brake devices.

The cable installation aiding device 30 has a guide member 40 that can be attached to the inner circumferential surface of the steerer tube 13b, and a fork rotation limiter 41 that can be attached to the outer circumferential surface of the steerer tube 30 together with the guide member 40, as shown in FIGS. 2 through 6.

In order to achieve a reduction in weight, the guide member 40 may, for example, be manufactured from a synthetic resin such as a polyacetal resin or the like. The guide member 40 guides the rear cable member 25r and the first and second wiring cords 27 and 28 in order to facilitate the installation of these members as cable members. The guide member 40 has an attachment part 42 that is attached to the inner circumferential surface of the steerer tube 13b, and first and second cable guide parts 43 and 44 that are disposed on the attachment part 42.

The attachment part 42 has two tubular screw fastening parts 42a and 42b disposed above and below with a gap in between, and a rib 42c that connects and reinforces these fastening parts. For example, attachment bolts 45 are threaded through the steerer tube 13b and screwed into the respective screw fastening parts 42a and 42b so that the guide member 40 is fastened to the steerer tube 13b together with the fork rotation limiter 41. The attachment bolts 45 are preferably self-tapping screws. Furthermore, gaps 42f are formed on both sides of the attachment part 42 in a state in which this part is mounted in the steerer tube 13b, so that cable members such as the front brake cable 25f, wiring cord that connects with the power generating hub, or the like can be threaded through. The distal ends of the screw fastening parts 42a and 42b are formed in a circular arcuate shape that conforms to the inner circumferential surface of the steerer tube 13b. Screw attachment holes 42d and 42e are formed in the screw fastening parts 42a and 42b. In this embodiment, attachment bolts 45 having the configuration of tapping screws are used, making it possible to dispense with the machining of the screw attachment holes 42d and 42e to form threads. However, in cases where ordinary bolts that do not have a self-tapping function are used as the attachment bolts, the screw attachment holes 42d and 42e can be machined in advance to form threads.

The first cable guide part 43 is formed in the upper part of the guide member 40. The first cable guide part 43 is integrally formed with the attachment part 42, and is a part that can guide the cable members (e.g., the rear brake cable 25r and first wiring cord 27) disposed in the steerer tube (13b) on the side facing the handlebar stem (17a) (i.e., on the upper end in FIG. 2) and along the outer circumferential side of the steerer tube 13b by changing the direction of these cable members to the outer circumferential side of the steerer tube 13b. The first cable guide part 43 has a first guiding surface 43a which is inclined and bent so as to connect the upper end and outer circumferential side of the steerer tube 13b in a state in which the attachment part 42 is attached to the inner circumferential surface of the steerer tube 13b. The first guiding part also has a pair of first side wall parts 43b that are disposed on both sides of the first guiding surface 43a, and a first connecting part 43c that connects the first side wall parts 43b. Cable members that are threaded through from the upper end or outer circumferential side can be guided to the outer circumferential side or upper end by means of this first guiding surface 43. Accordingly, cable members can be led out in the desired direction merely by threading the cable members through toward the first guiding surface 43a. The first guiding surface 43a is bent in the forward-rearward direction (left-right direction in FIG. 6), and is also bent in the left-right direction (direction orthogonal to the plane of the page in FIG. 6). Accordingly, the distal end of the guided cable member tends to be deflected toward the central portion of the first guiding surface 43a. Furthermore, one end of the first cable guide part 43, which includes the first connecting part 43c, is formed in a circular arcuate shape having an external diameter that is slightly smaller than that of the inner circumferential surface of the steerer tube 13b.

The second cable guide part 44 is formed in the lower part of the guide member 40 with a vertical length that is less than that of the first cable guide part 43. The second cable guide part 44 is integrally formed with the attachment part 42, and is a part that can guide the cable members disposed (e.g., the second wiring cord 28) in the steerer tube (13b) on the side facing the fork part (13a) (i.e., on the lower end in FIG. 2) and along the outer circumferential side of the steerer tube 13b by changing the direction of these cable members to the outer circumferential side of the steerer tube 13b. The second cable guide part 44 has a second guiding surface 44a which is inclined and bent so as to connect the lower end and outer circumferential side of the steerer tube 13b in a state in which the attachment part 42 is attached to the inner circumferential surface of the steerer tube 13b. The second cable guide part also has a pair of second side wall parts 44b that are disposed on both sides of the second guiding surface 44a, and a second connecting part 44c that connects the second side wall parts 44b. Cable members that are threaded through from the lower end or outer circumferential side can be guided to the outer circumferential side or lower end by means of this second guiding surface 44. Accordingly, cable members can be led out in the desired direction merely by threading the cable members through toward the second guiding surface 44a. Similar to the first guiding surface 43a, the second guiding surface 44a is bent in the forward-rearward direction (left-right direction in FIG. 6), and is also bent in the left-right direction (direction orthogonal to the plane of the page in FIG. 6). Accordingly, the distal end of the guided cable member tends to be deflected toward the central portion of the second guiding surface 44a. The radius of curvature of this bent portion is greater than that of the first cable guide part 43a. Furthermore, similar to the first cable guide part 43, one end of the second cable guide part 44, which includes the second connecting part 44c, has an external shape that is slightly less than the inner circumferential surface of the steerer tube 13b. The guide member 40 as a whole thereby has an external shape that is slightly less than that of the steerer tube 13b, so that the inner circumferential part of the steerer tube 13b can be mounted with greater ease.

Figure 7:
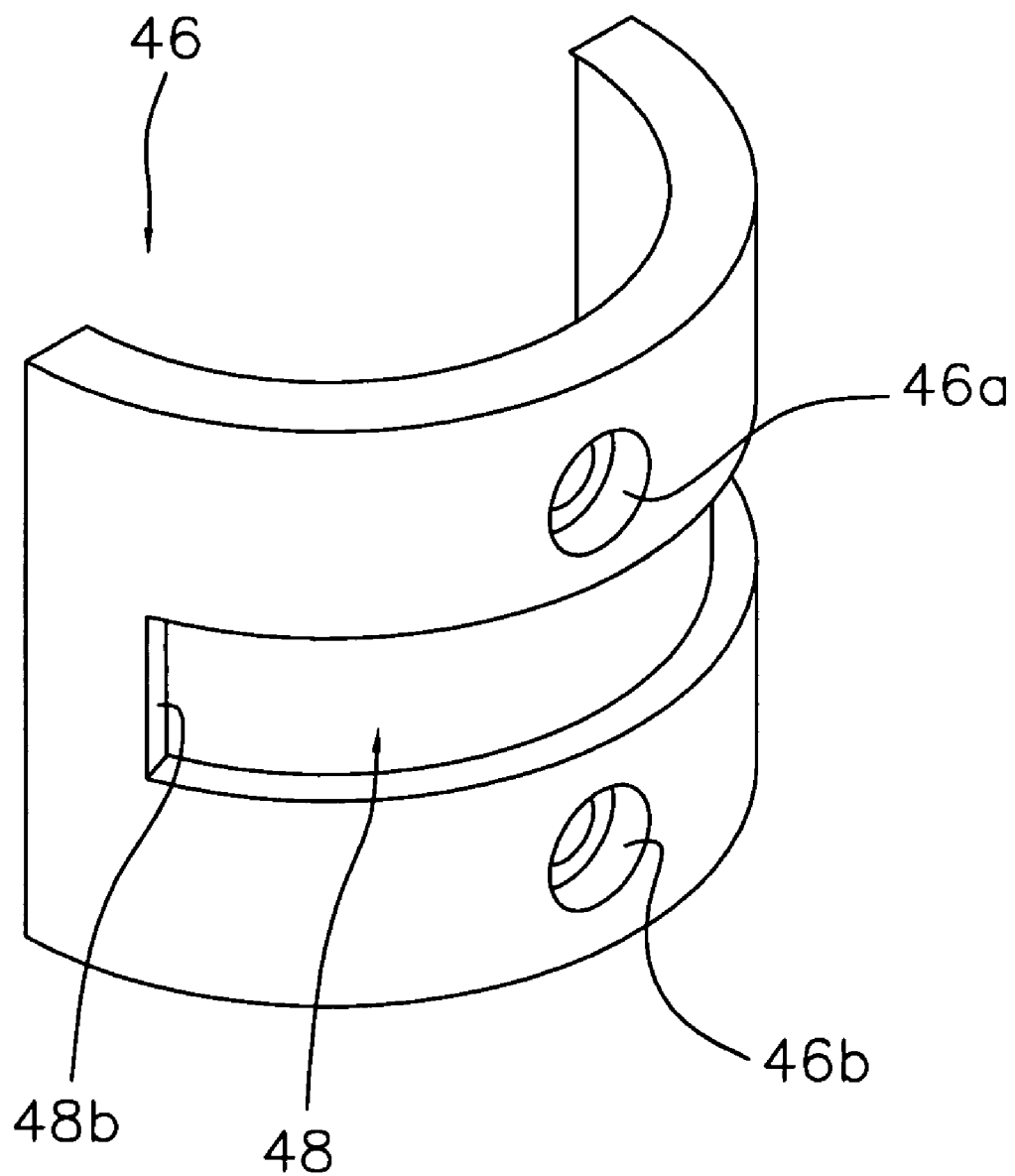
FIG. 7 is a perspective view of the limiter in accordance with the present invention.

The fork rotation limiter 41 is provided in order to prevent the occurrence of problems such as wire breakage or the like (due to rotation of the steerer tube 13b) in cable members mounted between the steerer tube 13b and the frame main body 12a. As is shown in FIGS. 2, 3 and 7, the fork rotation limiter 41 has a limiting member 46 which can be attached together with the attachment part 42 of the guide member 40 by means of two attachment bolts 45, and a limiting projection 47 that comes into contact with the limiting member 46. For example, the limiting member 46 is a semicircular arcuate member fastened to the outer circumferential surface of the steerer tube 13b by means of two attachment bolts 45. In its outer circumferential surface, the limiting member 46 has a limiting groove 48 provided with first and second limiters 48a and 48b disposed at a specified circumferential interval (e.g., the center angle of the circular arc is approximately 160 degrees).

The first and second limiters 48a and 48b are constructed by wall surfaces on both sides of the limiting groove 48 in the circumferential direction. Attachment holes 46a and 46b, through which the two attachment bolts 45 can be passed, are formed above and below at a specified interval in the central portion of the limiting member 46 in the circumferential direction on either side of the limiting groove 48. The external shape of the limiting member 46 is smaller than the internal diameter of the lower bearing 23b. Accordingly, the limiting member 46 can pass through the inner circumferential side of the bearing 23b when mounted on the outer circumferential surface of the steerer tube 13b. Accordingly, the steerer tube 13b can be inserted from the lower end of the head tube 12b and mounted in the head tube 12b when the limiting member 46 and the guide member 40 are mounted in the steerer tube 30 beforehand by means of the same attachment bolts 45.

For example, the limiting projection 47 is constructed from a bolt member. threadedly fastened to the head tube 12b. The distal end of the limiting projection 47 is disposed between the first and second limiters 48a and 48b, and has a length that allows contact to be made with both limiters 48a and 48b. Moreover, the limiting member 47 is not limited to a bolt member and may have any other construction as long this member has a configuration that can extend to the inner circumferential side of the head tube 12b and contact both limiters 48a ad 48b.

For example, when a cable member is to be installed using a cable installation aiding device 30 having such a construction, the mounting member 33 is removed, and the installation is performed in a state in which the interior of the steerer tube 13b can easily be seen.

For example, in a case in which the front brake cable 25f is to be threaded through the frame main body 12a from the interior of the steerer tube 13b via the handlebar stem 17a and second through-hole 13c, the front brake cable 25f that is led out from the handlebar stem 17a is passed along of the two sides of the attachment part 42 of the guide member 40 and is conducted to a point beneath the steerer tube 13b.

In a case where the rear brake cable 25r or first wiring cord 27 is to be threaded through the frame main body 12a from the interior of the steerer tube 13b via the handlebar stem 17a, the rear brake cable 25r or first wiring cord 27 that is led out from the handlebar stem 17a is passed toward the first guiding surface 43a of the first cable guide part 43 of the guide member 40. When the distal end of the rear guide cable 25r or the first wiring cord 27 comes into contact with the first guiding surface 43a, the direction in which the cable member is threaded is changed to the outside circumferential surface by the first guiding surface 43a, so that the rear brake cable 25r or the first wiring cord 27 is led out into the interior of the frame main body 12a via the third through-hole 13d and first through-hole 12d. In cases where the first wiring cord 27 does not have much elasticity, the first wiring cord 27 may be wrapped around the rear brake cable 25r or the like, and the two cable members may be simultaneously installed.

In a case where the second wiring cord 28 is to be threaded through the interior of the frame main body 12a from the interior of the steerer tube 13b via the fork part 13a, the second wiring cord 28 is passed toward the second guiding surface 44a of the second cable guide part 44 of the guide member 40. When the distal end of the second wiring guide 28 comes into contact with the second guiding surface 44a, the direction of passage of this cable member is changed to the outer circumferential side by the second guiding surface 44a, so that the rear brake cable 25r or the second wiring cord 28 is led out into the interior of the frame main body 12a via the third through-hole 13d and the first through-hole 12d.

Here, the system is devised so that the guide member 40 of the cable installation aiding device 30 can be attached to the inner circumferential surface of the steerer tube 13b, and that the direction of the cable member can be changed to the outer circumferential side of the steerer tube 13b by the first cable guide part 43. Therefore, the cable members can be guided to the outer circumferential side or upper end of the steerer tube in a simple manner merely by inserting the cable members from the upper end or outer circumferential side of the steerer tube. This can be achieved by machining the through-holes that communicate with the steerer tube 13b or head tube 12b. Accordingly, the exposure of the cable members can be minimized in the running of cable members to the outer circumferential side from the steerer tube.

In the abovementioned embodiment, the first and second cable guide parts 43 and 44 were disposed on the upper part and lower part of the guide member 40. However, depending on the direction of installation of the cable members, it would also be possible for both of these guide parts to be installed only on one or the other of these parts of the guide member 40.

The examples of cable members in the abovementioned embodiment were Bowden type brake cables 25f and 25r having inner cables and outer casings, and first and second electrical wiring cords 27 and 28 used for electrical wiring. However, the cable members that can be used are not limited to these. For example, Bowden type gearshift cables, as well as hydraulic tubes used for hydraulic piping connected to disk brakes and the like can also be cited as examples of cable members that can be used.

In the abovementioned embodiment, the guide member 40 and the limiting member 46 were attached by the same attachment bolts 45. It is also possible, however, to mount the guide member and limiting member in the steerer tube separately. In this case, there are no restrictions on the mounting position of the limiting member.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle steering arrangement comprising:
    a steerer tube having a first axial end, a second axial end and a circumferential side opening spaced between the first and second axial ends;
    at least one first cable member passing through the steerer tube between the first axial end and the outer circumferential side opening; and
    a bicycle cable installation aiding device attached to the steerer tube, the bicycle cable installation aiding device comprising
        an attachment part attached to an inner circumferential surface of the steerer tube; and
        a first cable guide part extending relative to the attachment part and having a concave surface for receiving and guiding the first cable member passing through the steerer tube between the first axial end and the outer circumferential side opening.

2. The bicycle steering arrangement according to claim 1, wherein
the first cable member includes a Bowden cable.

3. The bicycle steering arrangement according to claim 1, wherein
the first cable member includes a hydraulic tube.

4. The bicycle steering arrangement according to claim 1, wherein
the first cable member includes an electrical wiring cord.

5. The bicycle steering arrangement according to claim 1, wherein
the bicycle cable installation aiding device further comprising a second cable guide part coupled to the attachment part, the second cable guide part being configured and dimensioned to guide at least one second cable member passing through the steerer tube between the second axial end of the steerer tube and the outer circumferential side opening of the steerer tube.

6. The bicycle steering arrangement according to claim 1, wherein
the attachment part and the first cable guide part are integrally formed as a one-piece, unitary member.

7. The bicycle steering arrangement according to claim 1, wherein
the attachment part and the first cable guide part are configured to form a gap for receiving at least one third cable member pass between the attachment part and an inner circumferential surface of the steerer tube.

8. The bicycle steering arrangement according to claim 1, wherein
the first cable guide part includes a curved guiding surface that bends so that first axial end of the steerer tube and the outer circumferential side opening are connected.

9. The bicycle steering arrangement according to claim 1, further comprising
a fork rotation limiter arrangement configured and dimensioned to be attached to an outer circumferential surface of the steerer tube and an inner circumferential surface of a head tube to limits rotation of the steerer tube to a specified range.

10. The bicycle steering arrangement according to claim 9, wherein
the fork rotation limiter comprises
a limiting member attached to the outer circumferential surface of the steerer tube together with the attachment part, the limiting member including first and second limiters that are disposed at a specified interval in a circumferential direction; and
a limiting projection configured and dimensioned to be fastened to the head tube, with a distal end of the limiting projection disposed between the two limiters when the fork rotation limiter is couple between the steerer tube and the head tube.

* * * * *